US012625951B2

(12) United States Patent　　　　(10) Patent No.:　US 12,625,951 B2
Hickie　　　　　　　　　　　　　　(45) Date of Patent:　May 12, 2026

(54) SYSTEM AND METHOD FOR PREVENTING ATTACKS ON A MACHINE LEARNING MODEL BASED ON AN INTERNAL STATE OF THE MODEL

(71) Applicant: Irdeto B.V., Hoofddorp (NL)

(72) Inventor: Thomas Hickie, Ottawa (CA)

(73) Assignee: Irdeto B.V., Hoofddorp (NL)

( * ) Notice: Subject to any disclaimer, the term of this patent is extended or adjusted under 35 U.S.C. 154(b) by 76 days.

(21) Appl. No.: 18/442,402

(22) Filed: Feb. 15, 2024

(65) Prior Publication Data

US 2024/0303328 A1　　Sep. 12, 2024

(30) Foreign Application Priority Data

Mar. 10, 2023　(EP) ..................................... 23161297

(51) Int. Cl.
*G06F 21/55*　　　(2013.01)
*G06N 5/04*　　　(2023.01)
*G06N 20/00*　　　(2019.01)

(52) U.S. Cl.
CPC ............. *G06F 21/554* (2013.01); *G06N 5/04* (2013.01); *G06N 20/00* (2019.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 11,915,152 B2 * | 2/2024 | Baker | ..................... | G06N 20/20 |
| 2020/0329144 A1 * | 10/2020 | Morgan | ................. | G06N 20/00 |
| 2021/0056404 A1 * | 2/2021 | Goswami | ................ | G06F 9/542 |
| 2021/0182735 A1 * | 6/2021 | Fischer | .................... | G06N 5/04 |
| 2021/0216831 A1 * | 7/2021 | Ben-Itzhak | ......... | G06F 18/2155 |
| 2021/0281592 A1 | 9/2021 | Givental et al. | | |
| 2021/0319093 A1 | 10/2021 | Molloy et al. | | |
| 2023/0008628 A1 * | 1/2023 | Mahanta | ................ | G06N 20/00 |
| 2024/0220778 A1 * | 7/2024 | Wenger | .................. | G06N 20/00 |

OTHER PUBLICATIONS

Extended European Search Report dated Jan. 9, 2023 for European Application No. 23161297.9, 13 pages.

* cited by examiner

*Primary Examiner* — Chris Parry
*Assistant Examiner* — Abderrahmen Chouat
(74) *Attorney, Agent, or Firm* — James J. DeCarlo; Greenberg Traurig, LLP

(57)　　　　ABSTRACT

Disclosed implementations include a method of detecting attacks on Machine Learning (ML) models by applying the concept of anomaly detection based on the internal state of the model being protected. Instead of looking at the input or output data directly, disclosed implementation look at the internal state of the hidden layers of a neural network of the model after processing of data. By examining how different layers within a neural network model are behaving an inference can be made as to whether the data that produced the observed state is anomalous (and thus possibly part of an attack on the model).

20 Claims, 9 Drawing Sheets

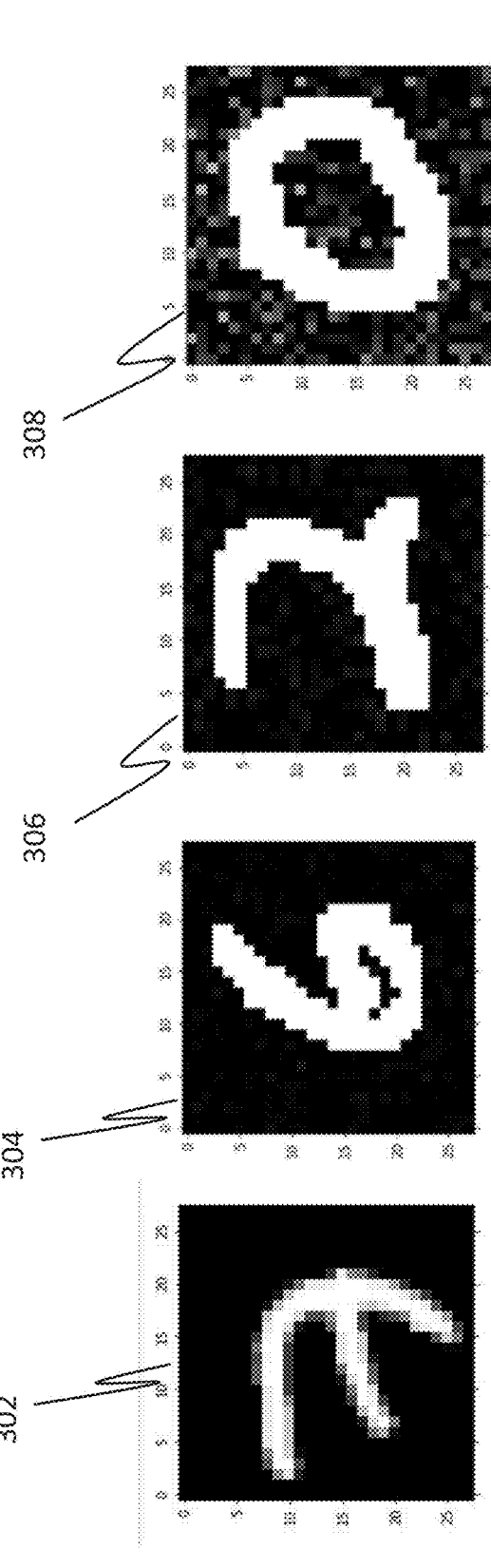
FIG. 3

400

A binary classifier (0 – normal data; 1 – anomaly)

```
from tensorflow.keras.models import Sequential
from tensorflow.keras.layers import Dense, Conv2D, MaxPool2D, Flatten
model = Sequential()
model.add(Dense(X_train.shape[0], input_shape=(784,), activation='relu'))
model.add(Dropout(0.2))
model.add(Dense(X_train.shape[0], input_shape=(784,), activation='relu'))
model.add(Dropout(0.5))
model.add(Dense(128, activation='relu'))
model.add(Dense(1, activation='sigmoid'))

print("[INFO] training network...")
sgd = SGD(0.00001, decay=1e-6, momentum=0.9, nesterov=True)
#sgd = optimizers.SGD(lr=0.0001, decay=1e-6, momentum=0.9, nesterov=True)
model.compile(loss="binary_crossentropy", optimizer='adam',
metrics=["accuracy"])

model.summary()
Model: "sequential"
```

| Layer (type) | Output Shape | Param # |
| --- | --- | --- |
| dense (Dense) | (None, 3040) | 100320 |
| dropout (Dropout) | (None, 3040) | 0 |
| dense_1 (Dense) | (None, 1) | 3041 |

```
Total params: 103,361
Trainable params: 103,361
Non-trainable params: 0
```

FIG. 4

SYSTEM AND METHOD FOR PREVENTING ATTACKS ON A MACHINE LEARNING MODEL BASED ON AN INTERNAL STATE OF THE MODEL

BACKGROUND

Artificial Intelligence (AI) refers to computer models that simulate the cognitive processes of human thought. Recently AI has found many applications. For example, ChatGPT is an AI model that interacts with users to provide information and creative works in a conversational way. Further, autonomous and semi-autonomous vehicles can use AI to recognize objects (such as pedestrians, traffic signs, and other vehicles), and ride-sharing apps can use AI to determine wait time and real-time ride pricing. One common type of AI is Machine Learning (ML), which is used to find the probability of a certain outcome using analytical experimentation. ML leverages large sets of historical "training data" that are fed into a statistical model to "learn" one or more specific tasks, such as facial recognition. The more training data used, the more accurate the ML probability estimate will be. The corollary is that, if corrupted and/or anomalous data is input into the ML model, by an attacker for example, the ML model can be rendered inaccurate and/or inoperable. Of course, this presents security issues in ML applications.

Various ML algorithms are well-known (e.g., ADAP and RMSProp). ML models can be implements by "neural networks", also known as "artificial neural networks" (ANNs). Neural networks mimic the way that biological neurons signal one another in the human brain. Neural networks are comprised of multiple layers of nodes, including an input layer, one or more internal/hidden layers, and an output layer. Each node, or artificial "neuron", connects to another and has an associated weight and threshold. If the output of any individual node is above the specified threshold value, that node is activated, sending data to the next layer of the network.

Adversarial Machine Learning is a collection of techniques for discovering intentionally misleading data or behaviors in ML models. AI/ML models are susceptible to a variety of data-driven attacks. In particular, model cloning attacks which allow an attacker with "black box" access to create a clone of a target model by passing in specially crafted data samples, and adversarial attacks which allow an attacker to fool a target model by crafting special input. One method of protection is to determine if a model input is part of a data driven attack, and then alter the system output accordingly (i.e., by falsifying the output). However, this approach is limited in that it requires knowledge that data entering the target model is part of an attack. Techniques to harden AI systems against these attacks fall into two categories:

Adversarial training: a supervised learning method where many adversarial examples are fed into the model and explicitly labeled as threatening, to thereby train the model to recognize and categorize anomalous data; and Defensive distillation: adding flexibility to an algorithm's classification process so the model is less susceptible to exploitation.

Adversarial training can be effective, but it requires continuous maintenance to stay abreast of new threats and is limited in that it can only address known/predicted attacks for which labeled data sets are available. For this reason, it is often more practical to use an unsupervised learning approach. Many statistical methods exist for modelling data using unsupervised methods to determine how anomalous any one data sample is with respect to the statistical model. For example, isolation forests, auto encoders, etc. . . .

For more complex data sets however, building a model of 'what is normal' may require a considerable amount of preprocessing. For example, it cannot be determined if a sentence or paragraph 'fits' within the broader context of a document without some deep understanding of words and their meaning. Using images of faces, for example, if only the pixel intensities that represent the image are considered, a model of the raw data might be able to ascertain if there are too many spurious pixels (noise). However, the same model would not be able to flag a face with three eyes or two noses because it has no concept of eyes or nose. Simply detecting pixel level details might not allow detection of an attack if the face detection model is being attacked through the introduction of anomalies that don't show up at the pixel level. A more sophisticated model of anomaly that is able to understand this deeper contextual data would be required. Therefore, conventional techniques for protecting ML models from attack require large amounts of data, larger more sophisticated models and thus increased computing resources.

BRIEF SUMMARY

Disclosed implementations include a method of detecting ML attacks by applying the concept of anomaly detection based on the internal state of the model being protected. Instead of looking at the input or output data directly, disclosed implementation look at the internal state of the hidden layers of a neural network of the model after processing of input data. By examining how different layers within a neural network model are behaving an inference can be made as to whether the data that produced the observed state is anomalous (and thus possibly part of an attack on the model).

One disclosed implementation is a method for protecting a Machine Learning (ML) model from attack, the method comprising: receiving, by the ML model, input data, wherein the ML model has been trained, by processing training data, to accomplish one or more specific tasks; retrieving internal state data of the model, the internal state data resulting from processing of the input data by the ML model; applying a classifier to the internal state data to segregate the input data into normal data and/or anomalous data; determining that the input data includes at least one set of anomalous data based on the applying step; and taking protective actions against attack of the ML model in response to the determining step. The method can also include storing the internal state data. The internal state data can include and activation state of selected neurons in hidden layers of the ML model. The selected neurons can all be in a single layer of the ML model or in multiple layers of the ML model. The one or more specific tasks can include image recognition. The protective actions can include at least one of terminating processing of the ML model and/or sending a notification to a predetermined entity. Another example of a protective action is to "poison" the model output if an attack is detected, by presenting the wrong answers instead of what the models actual output.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 3 shows various types of anomalous image data.

FIG. 4 is a definition of a ML model used for testing.

DETAILED DESCRIPTION

Figure 1:
FIG. 1 is an example of an anomalous image that can be difficult to detect using conventional automated image recognition methods.

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Disclosed implementations detect "anomalous" inputs for a ML model that, instead of requiring a model of input data, is based on the behavior of the model itself that is induced by processing the input data. For example, when building an attack detection system for a biometric face identification system, instead of looking at raw bytes of pixel intensities of facial image input data, the input data is passed to the neural network processing the face images. Then the internal state of the neurons of that neural network are examined and, based on the internal state, it is determined if the input data is anomalous or not. As noted above, a neural network is comprised of one or more layers of neurons. The neurons in one layer are connected by weighted synapses to neurons in the next layer ahead of it. A neuron consists of an accumulator and an activation function. The activation function performs some computation on the state of the neurons accumulator, and then propagates the result along its synapses, thus feeding the accumulator of the neurons it connects to. Therefore, a neuron can be thought to have include two states high or low) and intermediate values therebetween.

The disclosed implementations facilitate automation of the attack detection process (something that is normally difficult to do) because additional domain-specific knowledge of the data being examined is not required (as this knowledge has been captured by the model being used to evaluate the data set). Every model protected by the disclosed implementation is treated similarly since the data used for anomaly detection includes neuron states of the model being protected, regardless of the original input domain.

When applying the disclosed implementations, it is not necessary to know that the input data is, for example, images. Further, additional details can be obtained—such as ranges and other dynamics-because the data is the product of a tightly controlled process (the neural network we are protecting) that can be used to improve the attack detection system. This not only alleviates a large amount of work (e.g., data preparation and feature engineering), but it can also result in improved anomaly detection system accuracy. Once a system that is able to determine if a model is being used normally, or not, counter-measures can be employed, such as notifying an administrator, disabling an account, or altering the output in such a way as to confound an attacker (by manipulating the learnable signal). For example, the state of the accumulator, and the activated state can be examined to determine model state (in practice there may be additional state variables that can be used).

As an aid to understanding the disclosed implementations, it is helpful think of Neural Networks as fancy Boolean logic solvers. While this might seem counter-intuitive in a world of deep image understand and human-like natural language processing systems, this is how neural networks were initially described. When presented with lots of data, and not just a few inputs that we can assume represent a Boolean condition (like XOR), the neurons within a neural network begin to act like feature detectors that report the presence or absence of a particular pattern. That is to say, in the presence of some feature (like an eye or a face) a neuron will tend to 'fire high' to indicate that a feature is present (the True state).

Each weight (synapse) associated with a neuron contributes a small amount of 'evidence' for (or against) the presence of a particular pattern, and the neurons activation function serves as a mechanism to report how strongly that particular pattern is represented. As we go deeper into the layers of a neural network, the more abstract (contextually sensitive) the features being detected become as the network begins to describe patterns of patterns (of patterns of patterns of patterns . . . )

For example, almost all machine vision systems start by detecting the presence of basic image primitives; horizontal and vertical lines, corners, blobs, and white-space. In subsequent layers the presence of these primitives in specific combinations are used to detect features likes eyes, tires, ears, and legs. Later layers then detect specific collections of these abstracts to determine if something is a face (eyes and nose) or a car (tires, doors, windows).

The final output of a neural network model is, itself, a feature detector, but uses the total combined evidence of the input data re-encoded into a set of highly abstract features, to output a final result. In this way it can be stated that a face detection model might not really be saying "I see a face", but rather "I see eyes above a nose which is also above a mouth". This is an important distinction, especially when it comes to detecting anomalies.

ML models in pragmatic applications have, presumably, captured some contextual characteristics about the data they are designed to process. These models, while useful, are capable of very interesting miscalculations. Take, for example, image 100 (generated using Google Deep-dream) shown in FIG. 1. Different people may see a different number of dogs in image 100. However, most people will agree that image 100 is not normal. In spite of the obvious visual anomalies, most machine vision models seeing this data wouldn't understand that the image is put together in a way that defies reality. This is because the function of an image classifier is to detect things, not report oddities.

Conventionally, detection of this sort of anomaly would require a customized model, engineered with explicit knowledge of the problem domain. However, disclosed implementations do not require such a customized models. By building a model of anomaly against the internal state of an existing model (the model being itself protected) that already operates in the problem domain, additional problem-domain specific knowledge will not need to be engineered as a separate task for the purposes of anomaly detection.

Figure 2:
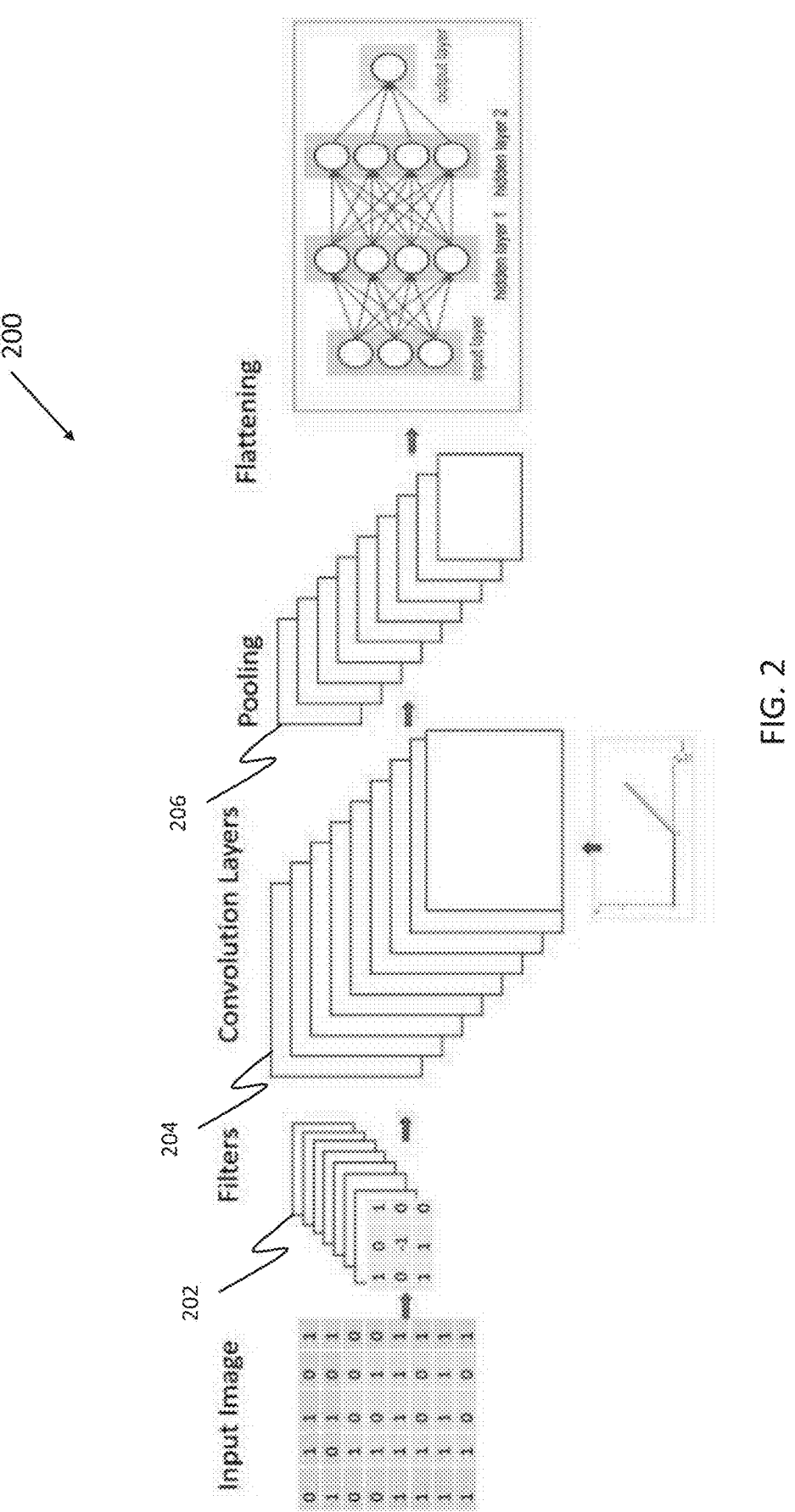
FIG. 2 is an architecture diagram of a typical ML model including a neural network.

FIG. 2 schematically illustrates an example of a typical neural network 200 including several filter layers 202, several convolutional layers 204, and several pooling layers 206 that process input data (e.g., image data). Filter layers 202 are used to detect specific global configurations of the features detected by the lower layers in the net. Each node in a filter layer learns its own set of weights on all of the nodes in the layer below it. Convolutional layers 204 each apply the same (usually small) filter repeatedly at different positions in the layer below it. For example, if the input layer has dimensions 512×512, you could have a conv layer that applies the same 8×8 filter (specified by 64 filter coefficients), at each point in (e.g.) a 128×128 grid overlaid on the input layer. The pooling layers 206 execute down-sampling on the feature maps coming from the previous layer and produce new feature maps with a condensed resolution. This reduces the spatial dimension of input to serve two primary purposes; 1) reduce the number of parameters or weights, thus lessening the computational cost, and 2) control the overfitting of the network. An ideal pooling method is expected to extract only useful information and discard irrelevant details. Neural network 200, and similar neural networks, are well known and one of skill in the art would understand how to construct the various layers of a neural network to suit the desired application/function.

By passing data through a neural network we can capture the state for each neuron in each layer or selected layers (either before or after the activation function has been applied). This state information can then be used to build a distribution of values for every single neuron. In other words, the accumulator (and/or activation output) is collected for each neuron (or application of a convolution or pooling operation) and stored as a data point. Then, using conventional methodologies a model of 'anomaly' can be built based on the stored data. In this way, if the neural network were ever to behave in a way that was outside the bounds of 'normal' we would know, such behavior can be detected.

Disclosed implementations can be focused on detecting contextually sensitive anomalies by targeting specific layers of the neural network. To detect odd 'raw' data, the input layers could be examined directly. To detect odd high-level patterns the status of deeper layers could be examined. Using the example of FIG. 1, it is very likely that a high density of eyes could be detected based on the state of one or more of pooling layers 206 of FIG. 2. Neurons would fire for detecting dogs inside of dogs in deeper layers (many activations at once, where there would normally only be sparse activations). Very specific anomaly types, such as offensive behavior in chat systems, cheating in video games, or even unusual application usage (malware) could be filtered and detected as long as the neural network has domain expertise. However, these are often context-driven activities that are difficult to detect when looking at raw input data.

If a data set of anomaly types of interest (such as multi-eyed dogs) were constructed, a classification model could be built using supervised learning, but one that is classifying the behavior of a target model and doesn't need to know about things like eyes or even dogs. In some situations, this might be more robust and thus require fewer training samples. By layering this type of anomaly detector onto an existing data-driven model of anomaly, some anomalous samples could be detected with a higher accuracy, as described below. Disclosed implementations result in highly effective (relative to the target model) anomaly detection models that can be created and executed with reduced resources.

Applicants have conducted several experiments to test usefulness of methods and systems in accordance with disclosed implementations for detecting anomalies. The experiments were designed so that a baseline (conventional methods of an input data based approach to anomaly detection) can be compared to the novel methods disclosed herein. The experiments were conducted along two different tracts to cover the two main methods of detecting anomalies: 1) supervised anomaly detection; and 2) unsupervised anomaly detection. A similar setup was used for both tracts.

The experiments were set up by first creating a state model (the model whose state would be monitored to look for anomalous data), as well as a data set containing clean data and data that contains anomalies. In both tracts a neural network model that is able to perform hand-written digit classification was used. The data set from the Modified National Institute of Standards and Technology (MNIST) database was applied as input data. The MNIST database is a large database of handwritten digits that is commonly used for training various image processing systems. The model was presented with raw pixel data representing a hand-written digit and outputs a class label indicating confidence in a known manner. The state-model was a 2-D convolution neural network that was trained against the MNIST data set and achieved >98% accuracy on clean data. That is to say, when presented with an image of a handwritten digit it was able to correctly identify the digit 98% of the time. Capturing the internal state of the model was accomplished using a readily available API call. Each time a sample is presented to the model we can ask the API to recover the activation value for each neuron at each layer.

To simulate anomalous data, varying amounts of noise was added to otherwise 'clean' images of hand-written digits. As shown in FIG. 3, dataset 300 includes images 302, 304, 306, and 308 which (with possibly the exception of image 302) are readily recognizable by the human eye as the digits 7, 6, 2, and 0 respectively.

It can be seen that the digits 7, 6, 2, and 0 include added anomalies such as jaggedness, extra pixels, and missing pixels. Anomalous data was created with 4 distinct algorithms and tagged as anomaly type 1, type 2, type 3, and type 4. Type 1 anomalies involved adding small perturbations to an existing sample. i.e., manipulating 5% of data points by shifting their values up, or down, by a small amount (0.01). Such anomalies are very hard to spot. Type 2: Anomalies were quantized—a value of 0.7 became a 1.0, and a value of 0.2 became a 0—and then small amounts of noise were randomly added. Type 3 anomalies were the same as type 2, except the frequency at which we added random perturbations was increased. Type 4 anomalies were the same as type 3, but lots of randomness and the magnitude of the random noise was increased. The anomalous samples were tracked according to the amount of noise (anomalies) that was added to each image to better determine where the conventional method and the disclosed embodiments might differ in terms of performance. A type-1 sample contains almost no anomalous signal, whereas a type 4 sample contains a significant amount of anomalous signal. As such we expect type-1 anomaly samples to be more difficult to detect.

Two data sets were created to facilitate the experiments. The first data set was a series of samples consisting of raw pixel data. These samples are a mix of, a) handwritten digits, and b) handwritten digits with varying amounts of noise added in (anomalies of types 1-4). Each sample was labeled as being either clean or anomalous. Anomalous samples were also labeled by type of anomaly. In the second set, a neural network model that can classify hand-written digits was presented with the above raw pixel data set, and for each sample the state of the model's neurons were retrieved with an API query and stored in memory as a database. In this way a new data set was created consisting of neuron states and a corresponding label (clean or anomalous/type). Model state data, i.e., neuron states, for each layer of this network was stored separately. In a supervised anomaly detection test, a binary classifier was taught what is and what isn't an anomaly by presenting it with labeled samples. Of course, this method requires a labeled training set consisting of clean data and anomalous data. While a supervised model can be very effective, it is often harder to create this type of model in the real world because it assumes we already know what an anomaly looks like (which is often not the case in real-world attacks).

A conventional binary classifier model was created (a three layer fully connected feed forward neural network) using the raw pixel data for both clean and anomalous data. FIG. 4 illustrates code 400, and a summary thereof, which define the example model used in testing. The model was given the class labels (clean, or anomalous) for each sample, and was therefore able to model the relationship. The conventional supervised model was able to correctly label samples 75% of the time. On clean data it correctly labeled 80% of samples as being clean, but misclassified 20% as being anomalous. On anomalous data is correctly labeled 63% of samples as being anomalous, but incorrectly labeled 37% as clean. Further, this conventional model predicted:

15% anomalies of the 1st Type.
13% anomalies o the 2nd Type.
26% anomalies o the 3rdType.
25% anomalies of the 4th Type.

Figure 5:
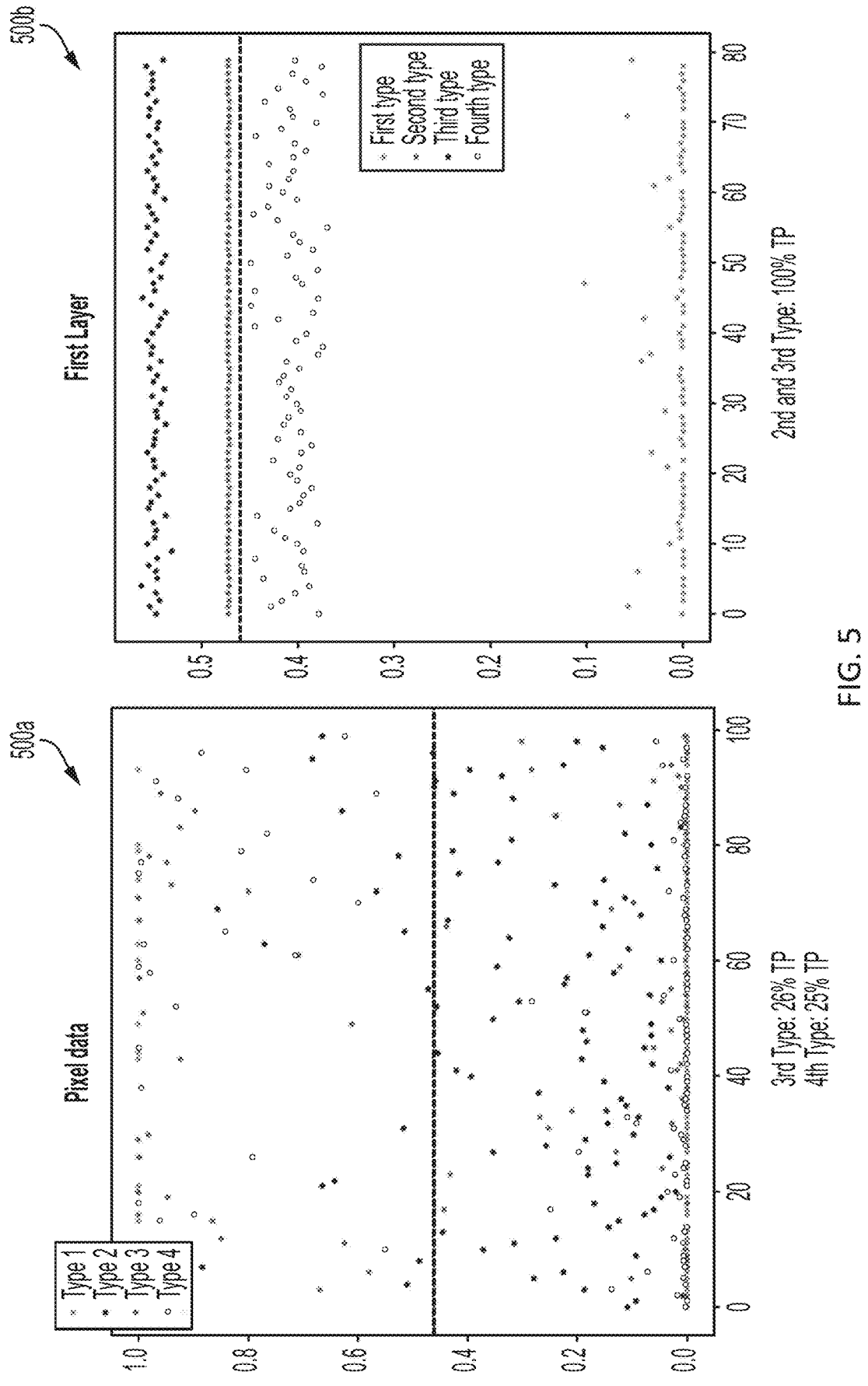
FIG. 5 illustrates results of anomaly detection by conventional methods and an example of disclosed implementations.

FIG. 5 shows plot 500a of all anomalous samples color coded by anomaly type as a result of using the input pixel data for anomaly detection in the conventional manner. A threshold of roughly 0.45 was established to distinguish between anomalous data and normal data in this example.

To compare this result of conventional methods with methods in accordance with disclosed implementations, the same binary classifier model was to the model-state data described above (i.e. neuron states after processing input data as contrasted with input image data itself). This model was also given the class labels for each sample. Again, the input data for the disclosed implementations is not pixel data, but rather neuron-activations for the state-model (context model). When using state data of the first layer of the model, this model was able to correctly predict:

0% anomalies of the 1st Type.
100% anomalies of the 2nd Type.
100% anomalies of the 3rd Type.
0% anomalies of the 4th Type.

FIG. 5 also shows plot 500b of all anomalous data resulting from using the state data of layer 1 of the model. It can be seen that this example of disclosed implementations is significantly more "decisive" than conventional methods. Stated differently, the disclosed implementations are more effective at distinguishing between the types of anomalies than conventional methods, as demonstrated by the strong segregation between types of a anomalies in the plot 500b as compared to plot 500a.

Figure 6:
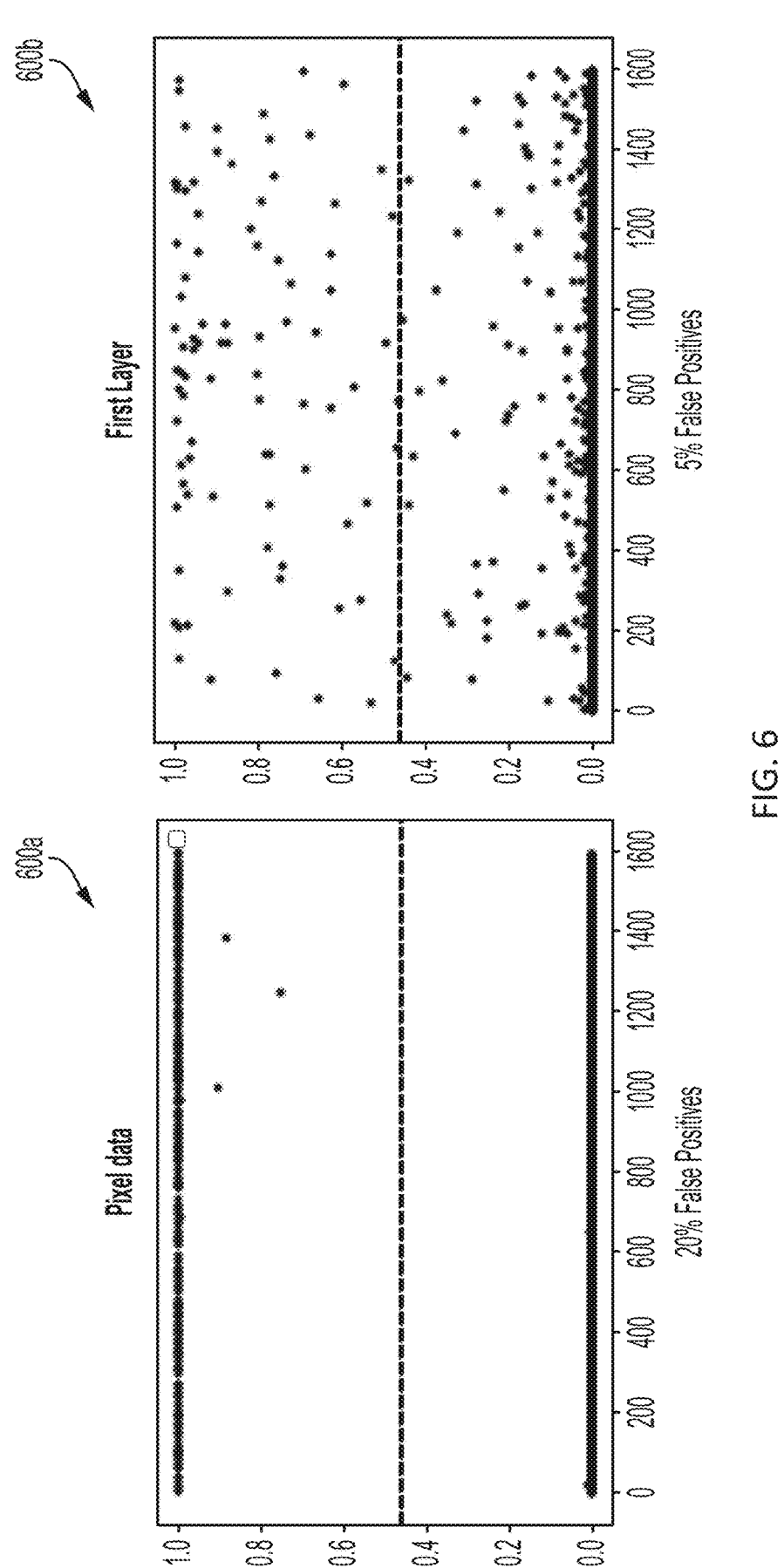
FIG. 6 illustrates results of anomaly detection by conventional methods and an example of disclosed implementations.

FIG. 6 plots all normal (non-anomalous) data resulting from the two methods. It can be seen that the use of input image data resulted in far more false positives, plot 600a, (indicating an anomaly when none was present) than the use of model state data, plot 600b. Such false positives for the conventional method were 20%. False positives for the example of the disclosed implementations was only 5%.

The test summarized above indicates that a supervised anomaly detection model based on model-state outperformed a supervised model based only on raw pixel data. In these experiments the example of disclosed implementations outperformed the baseline, in terms of detecting anomalous data, by a factor of 5. In other words, the use of pixel data model resulted in 5 times as many errors as the model-state based method. The types of anomalies most effectively detected by each method were different. The baseline model that used only pixel data was able detect some types of anomalies better than the method of the disclosed implementations, and vice-a-versa. Accordingly, a merger/hybridization of the two methods could be beneficial in some applications.

A test in an unsupervised anomaly detection environment was also conducted. In unsupervised anomaly detection the model does not know ahead of time what is, or is not, an anomaly. Rather, the model will look at a sample and provide a measure of how 'normal' the sample looks. This method tends to be more useful in pragmatic applications in that we don't need to know what a problem might look like ahead of time. Anything out of place should, in theory, be reported as 'not normal'. The downside, however, is that we don't control what is deemed to be 'not normal' during training of the model and this can produce unintended consequences. A conventional unsupervised machine learning model based on the known "isolation forest" algorithm was created using raw pixel data representing clean handwritten digits. Various hyper-parameters were explored, and the best performing model was able to detect approximately 50% of anomalous samples, but had a false-positive rate of approximately 50%. Stated differently, there was a 50/50 chance it would classify any sample as being anomalous. Of course, this is not a very useful result.

The same algorithm used in the conventional method was then applied to the state-model data representing clean hand-written digits, in accordance with disclosed implementations. This example of the disclosed implementations was able to correctly identify 99% of anomalous samples, with a false positive rate of approximately 1%. Whereas the supervised method did well using the state of the first layer of neurons, this method worked better using the second layer of neurons. When using state data of the second layer of the model, this model was able to correctly predict:

19% anomalies of the 1st Type.
100% anomalies of the 2nd Type.
100% anomalies of the 3rd Type.
100% anomalies of the 4th Type.

Figure 7:
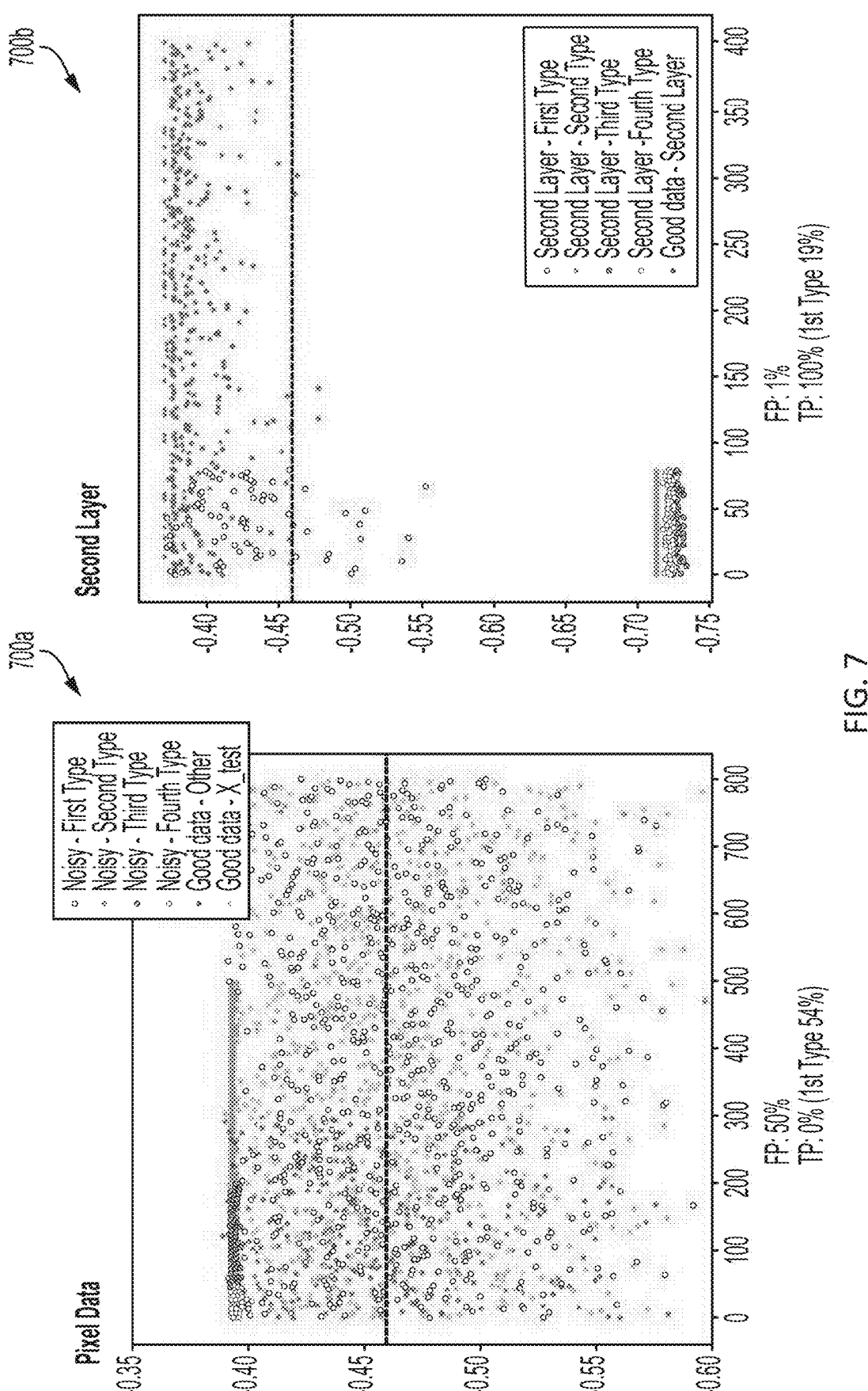
FIG. 7 illustrates results of anomaly detection by conventional methods and an example of disclosed implementations.

FIG. 7 shows the results for the various types of anomalies for the conventional method, plot 700a, and for the example of the disclosed implementations, plot 700b. It can be seen that an anomaly detection model created using unsupervised learning based on model-state outperformed a model based on raw pixel data. In this case the method in accordance with disclosed implementations was 100% better than the conventional method.

Figure 8:
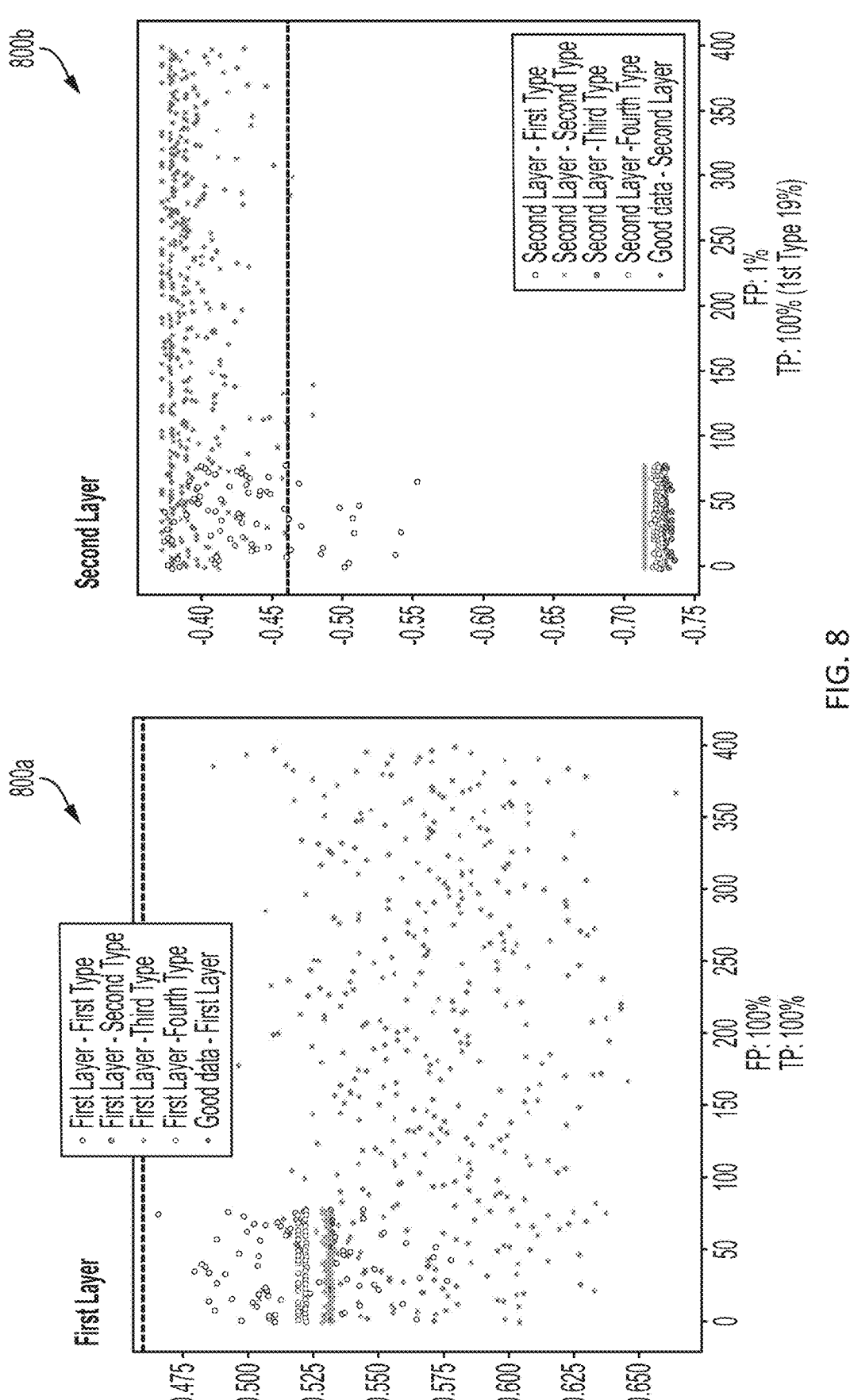
FIG. 8. illustrates results of anomaly detection using different layers of an ML model in accordance with disclosed implementations.

Various neurons in various layers can be used alone, or in combination, to determine anomalies. The appropriate neurons and/or layers for each application can be determined through testing and comparison. FIG. 8 illustrates a simple example of the ability to experimentally determine optimum layers and neurons to be used. In FIG. 8, graph 800*a* shows the results of all anomalies from the unsupervised example of disclosed implementations described above using the first layer of neurons. Graph 800*b* shows the results of all anomalies from the unsupervised example of disclosed implementations described above using the second layer of neurons.

In graph 800*a*, if anything below the dotted line (at −0.45) is considered to be an anomaly, then 100% of all data (good or bad) is considered anomalous. In other words, 100% of bad data is detected (100% true positive) but 100% of good data is mislabeled (100% false positive). This is the same threshold that is applied to graph 800*b* (a model based on the state of the second layer of the neural network), which misidentifies 1% of 'good data' as being anomalous (False Positive). But then correctly detects 100% of type 2, 3, and 4 anomalies (True Positive). Graph 800*b* shows a failure to detect 19% of Type 1 samples however. In graph 800*a* (first layer) if anything greater than −0.55 is considered to be anomalous, then the model would have actually produced better error metrics. Not as good as the Second Layer model, but still quite good. Based on these results, it can be seen that neurons of the first layer can be selected for greater accuracy.

Figure 9:
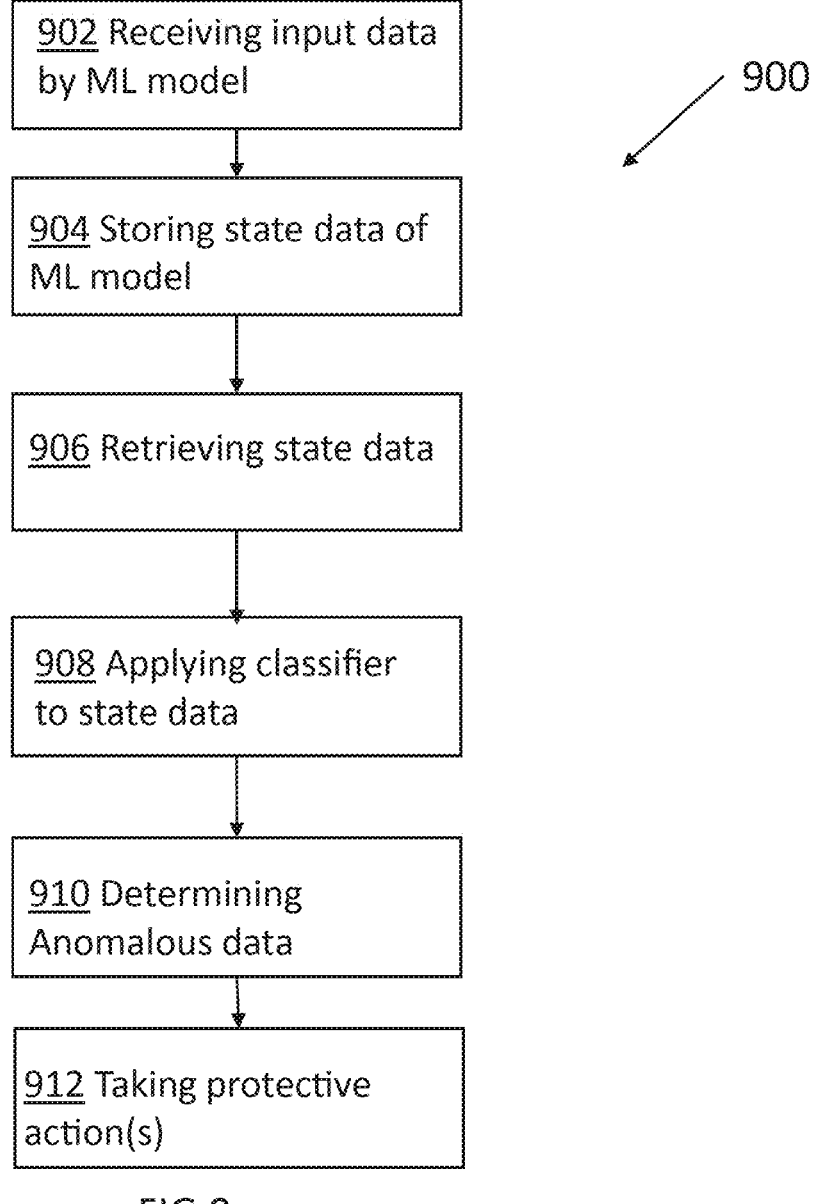
FIG. 9 is a flow chart of a method in accordance with disclosed implementations.

FIG. 9 illustrates a method, in accordance with disclosed implementations, for protecting a ML model from attack. At step 902 input data is received by the ML model. At step 904, the state date resulting from processing the input data is stored. At 906, the stored state data is retrieved and, at 908, the state data is input into a classifier. At 910, it is determined if the state data is anomalous based on the output of the classifier. At 912, assuming that an anomaly was detected, corrective action is taken. Corrective action can include shutting down the ML model, forcing a predefined output of the ML model, and/or notifying specified parties and/or devices.

The method of the disclosed implementations can be accomplished by one or more computing devices including functional "modules" comprised of code executable by a computer processor to carry out the functions described above. The computing devices implementing disclosed implementations can include a variety of tangible computer readable media. Computer readable media can be any available tangible media that can be accessed by device and includes both volatile and non-volatile media, removable and non-removable media. Tangible, non-transient computer storage media include volatile and non-volatile, and removable and non-removable media implemented in any method or technology for storage of information such as computer readable instructions, data structures, program modules or other data.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

It will be appreciated by those skilled in the art that changes could be made to the disclosed implementations without departing from the broad inventive concept thereof. It is understood, therefore, that this invention is not limited to the disclosed implementations, but it is intended to cover modifications within the spirit and scope of the present invention as defined by the appended claims.

What is claimed is:

1. A method for protecting a Machine Learning (ML) model from attack, the method comprising:

receiving, by the ML model, input data, wherein the ML model has been trained, by processing training data, to accomplish one or more specific tasks;

retrieving internal state data of the ML model, the internal state data comprising activation values of neurons within hidden layers of the ML model resulting from processing of the input data by the ML model;

applying a classifier to the internal state data to segregate the input data into normal data and/or anomalous data;

determining whether the input data includes at least one set of anomalous data based on an output of the classifier; and taking protective actions of the ML model based on the determining.

2. The method of claim 1, further comprising storing the internal state data.

3. The method of claim 1, wherein the neurons are either (a) all in a single layer of the ML model or (b) in multiple layers of the ML model.

4. The method of claim 1, wherein the one or more specific tasks include image recognition.

5. The method of claim 1, wherein the at least one set of anomalous data compromises the the ML model.

6. The method of claim 1, wherein the protective actions include at least one of terminating processing of the ML model, generating a predefined output, and/or sending a notification to a predetermined entity.

7. The method of claim 1, further comprising determining that the input data includes at least one set of anomalous data based on the input data itself.

8. A computer system for protecting a Machine Learning (ML) model from attack, the system comprising:

at least one computer processor; and at least one memory device operatively coupled to the at least one computer processor and storing instructions which, when executed by the at least one computer processor, cause the at least one computer processor to carry out of:

receiving, by the ML model, input data, wherein the ML model has been trained, by processing training data, to accomplish one or more specific tasks;

retrieving internal state data of the ML model, the internal state data comprising activation values of neurons within hidden layers of the ML model resulting from processing of the input data by the ML model;

applying a classifier to the internal state data to segregate the input data into normal data and/or anomalous data;

determining whether the input data includes at least one set of anomalous data based on an output of the classifier; and taking protective actions of the ML model based on the determining.

9. The system of claim 8, wherein the instructions further comprise storing the internal state data.

10. The system of claim 8, wherein the neurons are either (a) all in a single layer of the ML model or (b) in multiple layers of the ML model.

11. The system of claim 8, wherein the one or more specific tasks include image recognition.

12. The system of claim 8, wherein the at least one set of anomalous data compromises the ML model.

13. The system of claim 8, wherein the protective actions include at least one of terminating processing of the ML model, generating a predefined output, and/or sending a notification to a predetermined entity.

14. The system of claim 8, the instructions further comprising determining that the input data includes at least one set of anomalous data based on the input data itself.

15. A non-transitory computer-readable storage medium for tangibly storing computer program instructions capable of being executed by a computer processor, the computer program instructions defining steps of:

receiving, by a machine learning (ML) model, input data, wherein the ML model has been trained, by processing training data, to accomplish one or more specific tasks;

retrieving internal state data of the ML model, the internal state data comprising activation values of neurons within hidden layers of the ML model resulting from processing of the input data by the ML model;

applying a classifier to the internal state data to segregate the input data into normal data and/or anomalous data;

determining whether the input data includes at least one set of anomalous data based on an output of the classifier; and taking protective actions of the ML model based on the determining.

16. The non-transitory computer-readable storage medium of claim 15, wherein the neurons are either (a) all in a single layer of the ML model or (b) in multiple layers of the ML model.

17. The non-transitory computer-readable storage medium of claim 15, wherein the one or more specific tasks include image recognition.

18. The non-transitory computer-readable storage medium of claim 15, wherein the at least one set of anomalous data compromises the ML model.

19. The non-transitory computer-readable storage medium of claim 15, wherein the protective actions include at least one of terminating processing of the ML model, generating a predefined output, and/or sending a notification to a predetermined entity.

20. The non-transitory computer-readable storage medium of claim 15, the steps further comprising determining that the input data includes at least one set of anomalous data based on the input data itself.

* * * * *